United States Patent
Guidetti (10) Patent No.: US 7,222,892 B2
(45) Date of Patent: *May 29, 2007

(54) DEVICE FOR LOCKING TWO TELESCOPIC ELONGATED ELEMENTS

(76) Inventor: Pascal Guidetti, La Tour, F-39420 Revel (FR)

( * ) Notice: Subject to any disclaimer, the term of this patent is extended or adjusted under 35 U.S.C. 154(b) by 223 days.

This patent is subject to a terminal disclaimer.

(21) Appl. No.: 10/484,710

(22) PCT Filed: Jul. 19, 2002

(86) PCT No.: PCT/FR02/02581

§ 371 (c)(1),
(2), (4) Date: Aug. 5, 2004

(87) PCT Pub. No.: WO03/010439

PCT Pub. Date: Feb. 6, 2003

(65) Prior Publication Data

US 2004/0247379 A1  Dec. 9, 2004

(30) Foreign Application Priority Data

Jul. 24, 2001  (FR) .................................. 01 09834

(51) Int. Cl.
    *E05C 17/002*  (2006.01)
(52) U.S. Cl. .................. 292/306; 292/305; 403/109.1; 403/109.3; 403/109.7
(58) Field of Classification Search ............. 403/109.1, 403/109.2, 109.3, 109.4, 109.5, 109.6, 109.7, 403/109.8, 377; 292/292, 306, 305
See application file for complete search history.

(56) References Cited

U.S. PATENT DOCUMENTS

| 836,303 | A | | 11/1906 | Christensen |
| 2,495,674 | A | | 1/1950 | Lewis |
| 2,806,723 | A | * | 9/1957 | Fairclough .................. 403/104 |
| 3,986,480 | A | * | 10/1976 | Vail ........................... 119/428 |
| 5,595,410 | A | | 1/1997 | Wilson et al. |
| 6,409,412 | B1 | * | 6/2002 | Huang ...................... 403/109.3 |
| 6,869,112 | B2 | * | 3/2005 | Guidetti ..................... 292/306 |

FOREIGN PATENT DOCUMENTS

FR    2 522 743    9/1983

* cited by examiner

*Primary Examiner*—Daniel P. Stodola
*Assistant Examiner*—Daniel J. Mills
(74) *Attorney, Agent, or Firm*—Young & Thompson (57) ABSTRACT

Device for locking two elongated elements the first of which slides in the second telescopically, comprises members for locking in the longitudinal direction the first element relative to the second element, which include a lock washer arranged around the first element and whereof a circumferential portion is placed between two longitudinally opposite supports of the second element and an elastic return member placed between the second element and the washer and acting on the washer in a point distant from said supports so as to bring the lock washer into an extreme inclined position relative to the first element wherein the two opposite parts of said washer are in contact with the first element so as to lock the first element relative to the second element in the longitudinal direction.

8 Claims, 7 Drawing Sheets

FIG_1

FIG_2

FIG_3

FIG_4

FIG_5

FIG_6

FIG_7

DEVICE FOR LOCKING TWO TELESCOPIC ELONGATED ELEMENTS

The present invention relates to a device for locking two elongated elements, a first of which slides telescopically in a second.

More precisely, the present invention relates to an improvement to the locking device described in patent FR-A-00 04936.

According to one subject of the present invention, the device for locking two elongated elements, a first of which slides telescopically in a second, comprises means for locking, in a first longitudinal direction, the first element relative to the second element, which means comprise a locking washer arranged around the first element and a circumferential portion of which is placed between two longitudinally opposite supports of said second element, and an elastic return member placed between said second element and said washer and acting in said longitudinal direction on the washer at a point remote from said supports so as to bring the locking washer into an inclined end position relative to the first element, in which position two opposite portions of this locking washer are in contact with the first element in order to lock the first element relative to the second element in said longitudinal direction. The device further comprises a tilting member articulated on said second element, a spacer member placed between the locking washer and the tilting member, and a control member for acting on the tilting member, such that an action on this control member causes the tilting member to tilt, which tilting member, by way of the spacer member, acts on the locking washer so as to move it away from its aforementioned end position counter to said return means, thereby reducing its inclination, in order to release the first element relative to the second element.

According to the present invention, the tilting member and the spacer member are integral with each other.

According to another subject of the present invention, the locking device comprises second means for locking, in the other longitudinal direction, the first element relative to the second element, which means comprise a second locking washer arranged around the first element and a circumferential portion of which is placed between two second longitudinally opposite supports of said second element, and a second elastic return member placed between said second element and said second locking washer and acting in said other longitudinal direction on the second washer at a point remote from said second supports so as to bring the second locking washer into an inclined end position relative to the first element, in which position two opposite portions of this second washer are in contact with the first element in order to lock the first element relative to the second element in said other longitudinal direction. It further comprises a second spacer member placed between the second locking washer and said tilting member, such that the aforementioned action on this control member likewise acts, by way of the second spacer member, on the second locking washer so as to move it away from its aforementioned end position counter to said second return member, thereby reducing its inclination, in order to release the first element relative to the second element.

According to the present invention, said tilting member and said second spacer member are integral with each other.

According to a preferred alternative embodiment of the invention, the tilting member and said spacer member or members form a single component.

According to the present invention, said tilting member preferably comprises a tilting washer which surrounds said first element at a distance and which is mounted in an articulated manner on the second element, radially to the latter, and said spacer member or members preferably comprise a projecting part formed on the face of said tilting washer that faces said corresponding locking washer.

According to the present invention, said second element preferably comprises a casing composed of two assembled parts, the plane of contact between which parts extends in a longitudinal plane passing through the axis of said elements, in that said locking elements, said return members, said tilting member provided with said spacer members, and said control member are arranged in a space formed between said assembled parts of the second element, and in that said tilting member provided with said spacer members is articulated about an axis of said casing perpendicular to said plane of contact.

According to the present invention, said casing preferably comprises assembly collars which surround the ends of its aforementioned parts.

According to the present invention, said second element preferably comprises a tubular element, an end part of which is fixed to said casing and in which said first element can slide.

According to the present invention, said tubular element may advantageously comprise an auxiliary longitudinal duct, and in that said control member comprises a control rod arranged in this longitudinal duct.

According to the present invention said control member may advantageously comprise a button mounted movably on said casing so as to be able to be moved by pressure, this button and said tilting member preferably comprising bearing surfaces such that when said button is moved in one direction, it acts on said tilting member in order to move said washer away from its aforementioned end position.

According to the present invention, said button is preferably mounted pivotably on said casing so as to move substantially radially.

A better understanding of the present invention will be gained by studying a device for locking two telescopic elongated elements which is described by way of nonlimiting example and illustrated by the drawing, in which.

With reference to the figures, there can be seen a locking device 100 for locking, in the longitudinal direction, and relative to one another, a tubular inner elongated element 2 sliding in a duct 3 of an outer elongated element 4, the latter consisting of a substantially cylindrical casing 101 and a tubular element 102 of which one end is engaged in the casing 101. The duct 3 is formed partly through the casing 101 and partly within the tubular element 102.

The locking device 100 comprises a tilting washer 5 which is arranged around and at a distance from the inner element 2, in an annular inner housing 103 of the casing 101 of the outer element 4. This ring 5 has diametrically opposed spindles 7 and 8 which are arranged in opposite inner blind holes 9 and 10 in the casing 101, such that the washer 5 can pivot about an axis 11 which extends radially to the elements 2 and 4.

The locking device 100 further comprises, on one side and at a distance from the tilting washer 5, first locking means 12 which comprise a locking washer 13 arranged around the inner element 2 and in the inner annular housing 103 of the casing 101 of the outer element 4. This housing 103 has, on one side of the longitudinal plane passing through the axis 11, and between the tilting washer 5 and the locking washer 13, a central local narrowing 15 which defines two longitudinally opposite local supports 16 and 17, such that the locking washer 13 can pivot so as to assume positions which are inclined relative to the axis of the elements 2 and 4.

On the other side of said longitudinal plane and at the opposite side from the narrowing 15, the locking means 12 comprise a compression spring 18 arranged in a blind longitudinal orifice 19 which opens into the housing 103 in the direction of the tilting washer 5. This spring 18 acts on the face 13a of the locking washer 13 so as to repel it in the direction of the tilting washer 5 by pivoting between the supports 15 and 16.

The locking device 100 also comprises a spacer member which consists of a projecting part 104 formed on the face 5a of the tilting washer 5 that faces the locking washer 13, the end of this projecting part 104 coming to bear against the face 13b of the locking washer 13 at the opposite side from the spring 18.

The locking device 100 further comprises, on the other side of the tilting washer 5, second locking means 22 which are symmetrical to the locking means 12 relative to the radial axis 11.

These locking means 22 thus comprise a locking washer 23 arranged around the inner element 2 and within the inner housing 103 of the casing 101 of the outer element 4. This housing 103 has a local narrowing 25 which defines two longitudinally opposite local supports 26 and 27 situated substantially in longitudinal alignment with the spring 18 and the projecting part 104 of the tilting washer 5 of the first locking means 12.

The locking means 22 likewise comprise a compression spring 28 arranged in a blind longitudinal hole 29 in the casing 101 of the outer element 4 and acting on the locking washer 23 in the direction of the tilting washer 5.

The locking means 22 also comprise a spacer member which consists of a projecting part 105 formed on the face 5b of the tilting washer 5 that faces the locking washer 23, the end of this protecting part 105 coming to bear against the locking washer 23 on the opposite side from the spring 28.

The spring 28 and the projecting part 105 of the washer 5 are substantially in longitudinal alignment with the supports 16 and 17 of the locking means 12.

Figure 1:
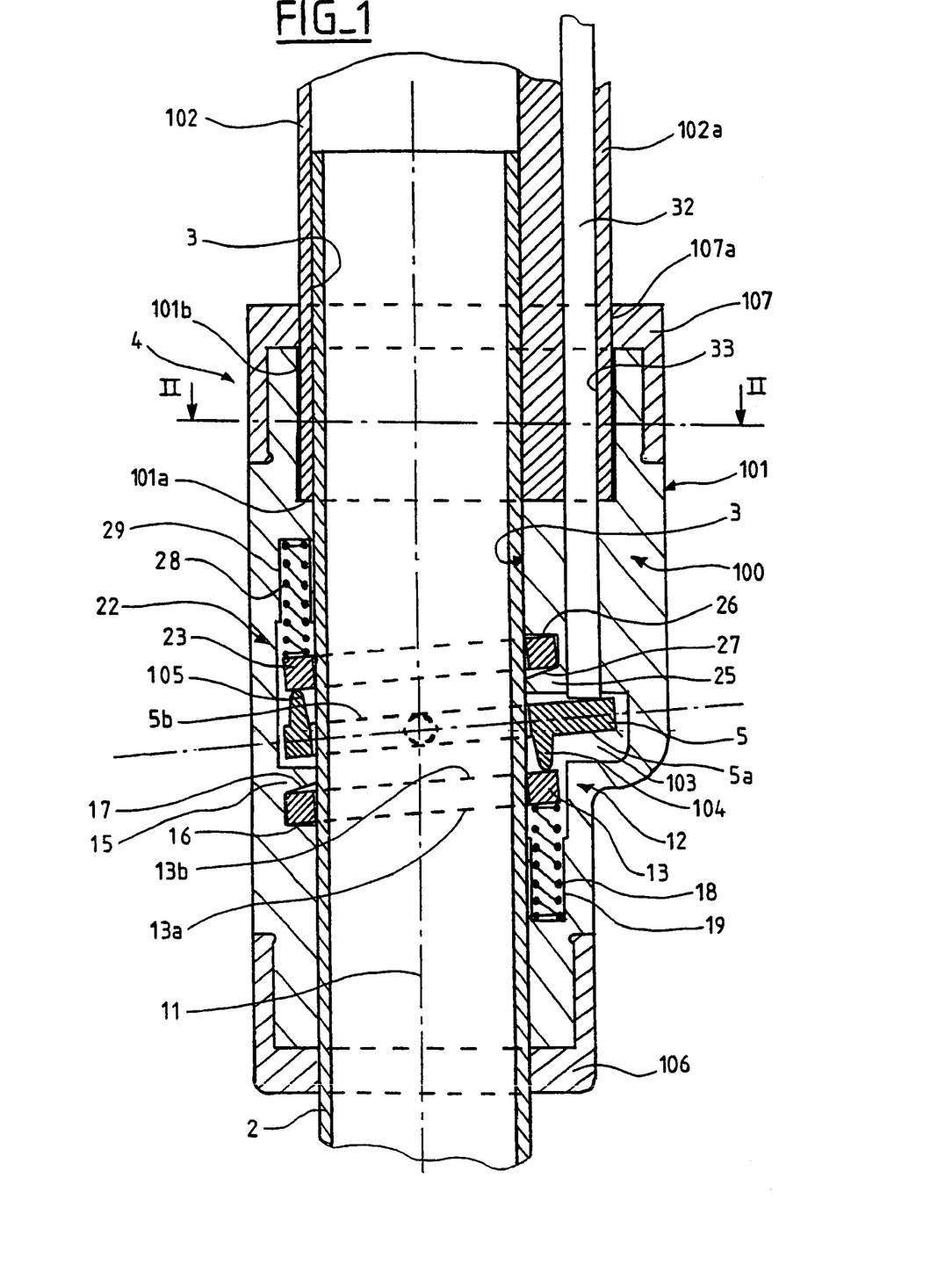
FIG. 1 represents a longitudinal section of a device for locking two telescopic elongated elements, in the locked position.
Figure 2:
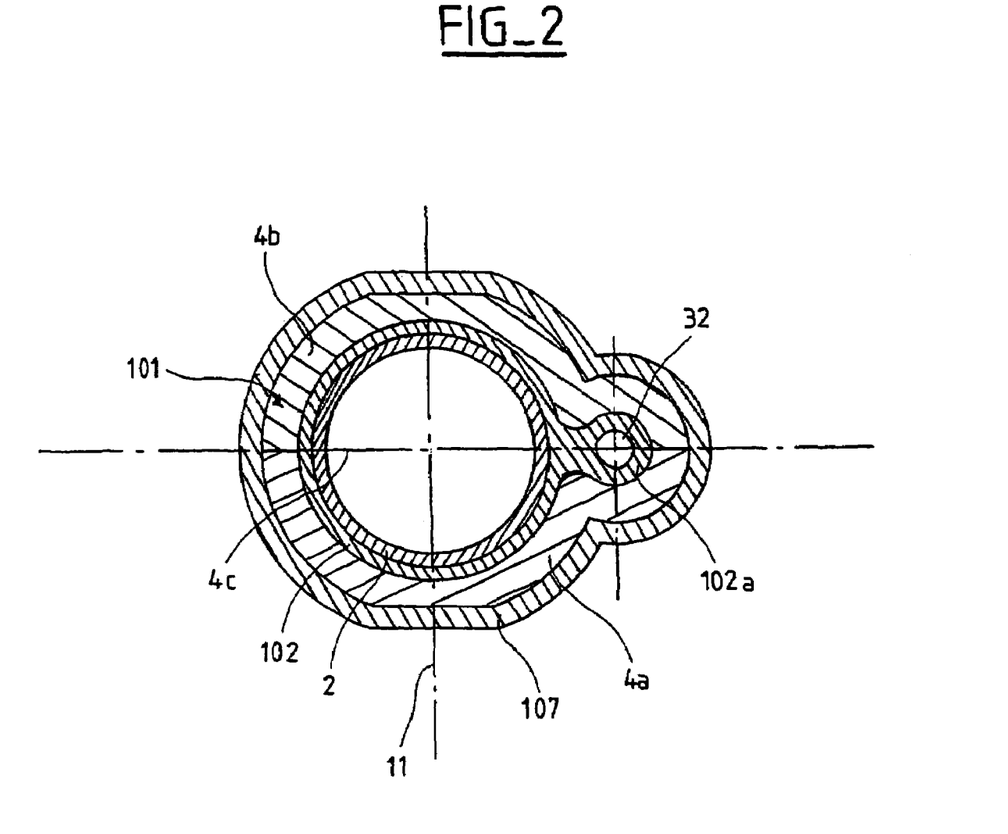
FIG. 2 represents a radial section on II—II of the device of FIG. 1.

In the version represented in FIGS. 1 and 2, the locking device 100 further comprises a longitudinal control rod 32 arranged in an auxiliary longitudinal duct 33 of the outer element 4, which passes at a distance from the narrowed part 25 of the housing 103 and of which the end 32a comes to bear against the face 5b of the tilting washer 5, on the opposite side from the projecting part 104 of this tilting washer 5. The auxiliary duct 33 is formed partly within the casing 101 and partly within a projecting longitudinal part 102a of the tubular element 102.

In the example represented in the figures, the casing 101 of the outer element 4 comprises two parts 4a and 4b presenting between them a longitudinal plane of contact 4c which extends perpendicular to the radial axis 11. These two parts 4a and 4b of the casing 101 are joined together by annular collars 106 and 107 surrounding their ends.

Thus, the two parts 4a and 4b of the casing 101 of the outer element 4 are symmetrical with respect to the longitudinal plane containing the longitudinal contact surface 4c, such that the part of the duct 3 of the casing 101 receiving the inner element 2, the part of the casing 101 receiving the end of the tubular elongated element 102, the part of the auxiliary duct 33 produced in the casing 101, the housing 103 receiving the washers 5, 13 and 23, and the blind holes 19 and 29 receiving the springs 18 and 28 are formed by halves in the parts 4a and 4b, symmetrically with respect to the plane of contact 4c.

The end of the tubular element 102 and of its projecting longitudinal part 102a is engaged in an annular cutout 101a of corresponding shape and fixed by a layer of adhesive 101b. The fixing collar 107 has a passage 107a of corresponding shape.

The locking device 100 of the example represented in FIGS. 1 and 2 operates in the following way.

When the control rod 32 is not subjected to any force, the springs 18 and 28 incline the locking washers 13 and 23 toward the tilting washer 5 until they are brought into an inclined end position in which they come into contact with the inner element 2 in two diametrically opposite areas, one situated on the side of the narrowed parts 15 and 27 and the other on the side of the springs 18 and 28. As the locking washers 13 and 23 are locked longitudinally in narrowed parts 15 and 25, they longitudinally lock, each in one direction, the inner element 2 relative to the outer element 4, which is thus locked longitudinally in both directions through a wedging effect.

By acting longitudinally on the control rod 32 in the direction of the tilting washer 5, it is then possible to pivot this tilting washer 5 about the radial axis 11. This tilting movement is then transmitted to the locking washers 13 and 23 by way of the projecting parts 104 and 105 of the tilting washer 5 so as to move them away from their inclined end locking position, thereby reducing their inclination, counter to springs 18 and 28.

These unlocking movements release the inner element 2 relative to the outer element 4, which are then able to be slid relative to one another. When they have reached a predetermined relative longitudinal position, the control rod 32 is released. The springs 18 and 28 then repel the washers 13 and 23 so as to bring them into their above-described locking position by tilting the tilting washer 5 in the opposite direction, which washer itself repels the control rod 32.

Figure 3:
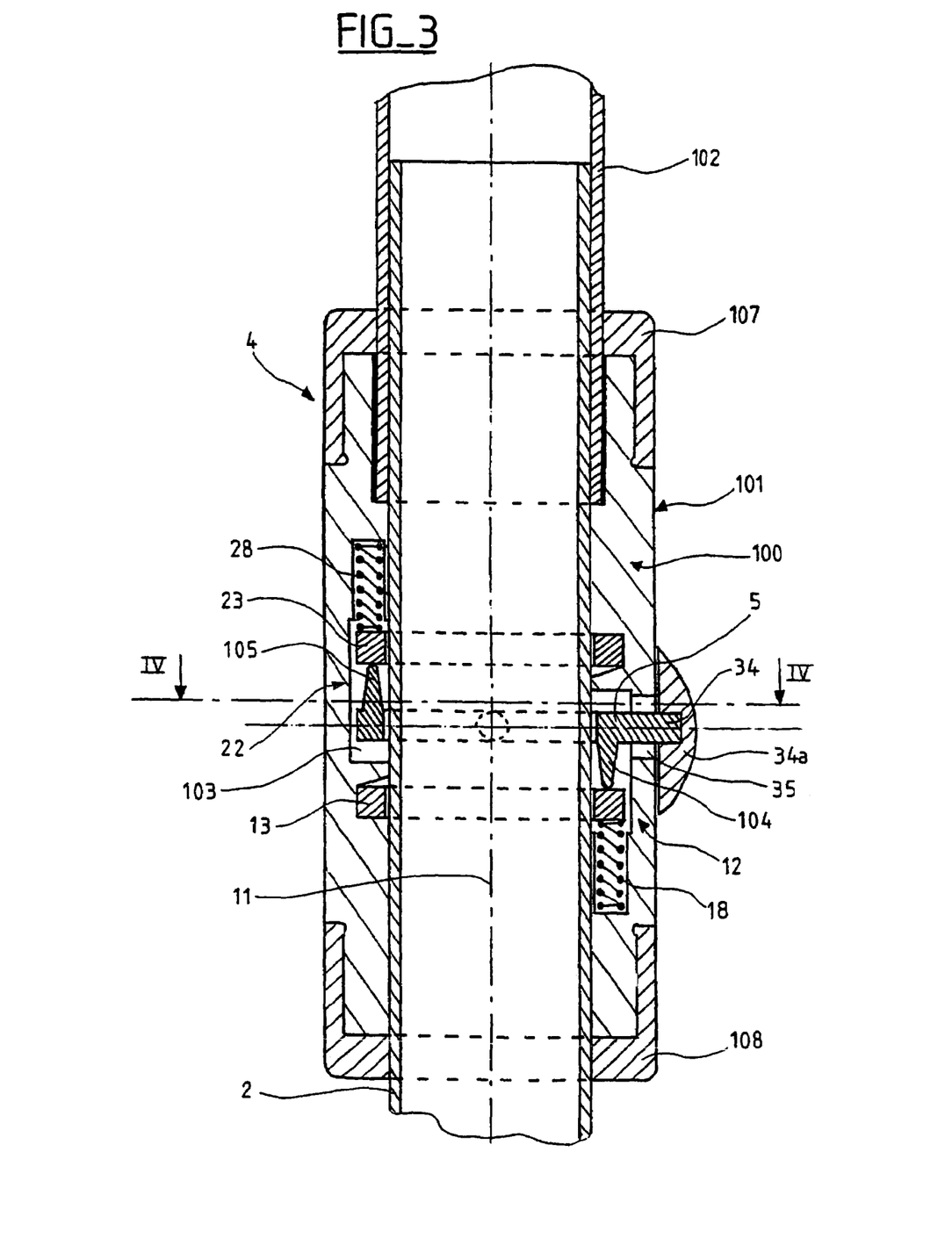
FIG. 3 represents a longitudinal section of an alternative form of embodiment of the locking device of FIG. 1, in the unlocked position.
Figure 4:
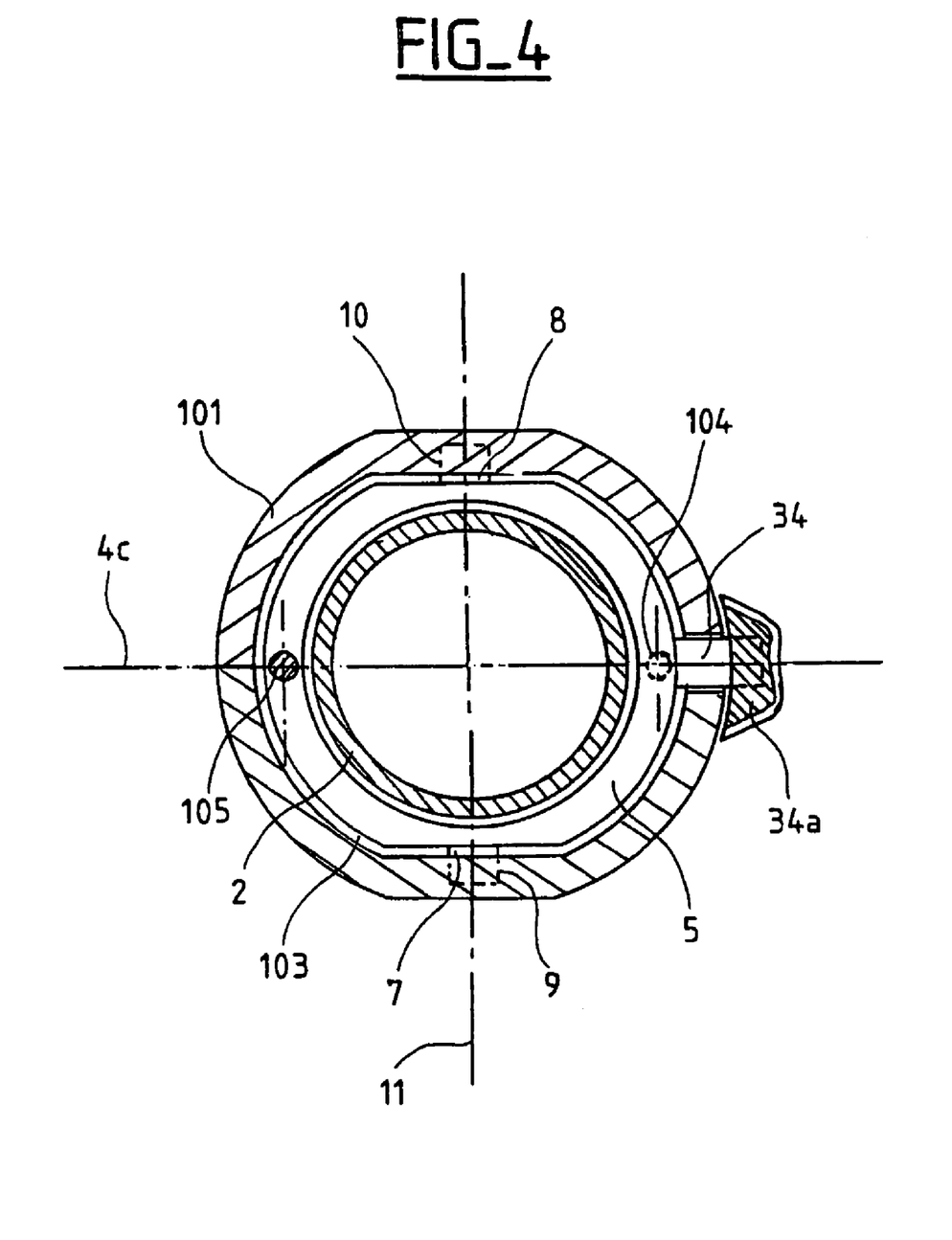
FIG. 4 represents a radial section on IV—IV of the device of FIG. 3.

With reference to the version represented in FIGS. 3 and 4, it can be seen that the locking device 100 differs from that shown in FIGS. 1 and 2 in that the control rod 32 is omitted, the elongated element 102 consists of a cylindrical tube and in that the tilting washer 5 has a lateral appendage 34 which extends through a passage 35 passing through the wall of the casing 101 of the outer element 4 and opening into the housing 103.

The appendage 34 of the tilting washer 5 additionally bears an outer button 34a.

By acting manually and longitudinally on the button 108 borne by the appendage 34, it is thus possible to tilt the tilting washer 5 as above so as to act on the washers 13 and 23 in the direction for unlocking them.

In an alternative form of embodiment, the tilting washer 5 provided with its projecting parts 104 and 105 constituting spacer members may be produced by molding. In another version, the projecting parts 104 and 105 of the tilting washer 5 could be attached to the washer 5 and fixed by screwing, for example.

Figure 5:
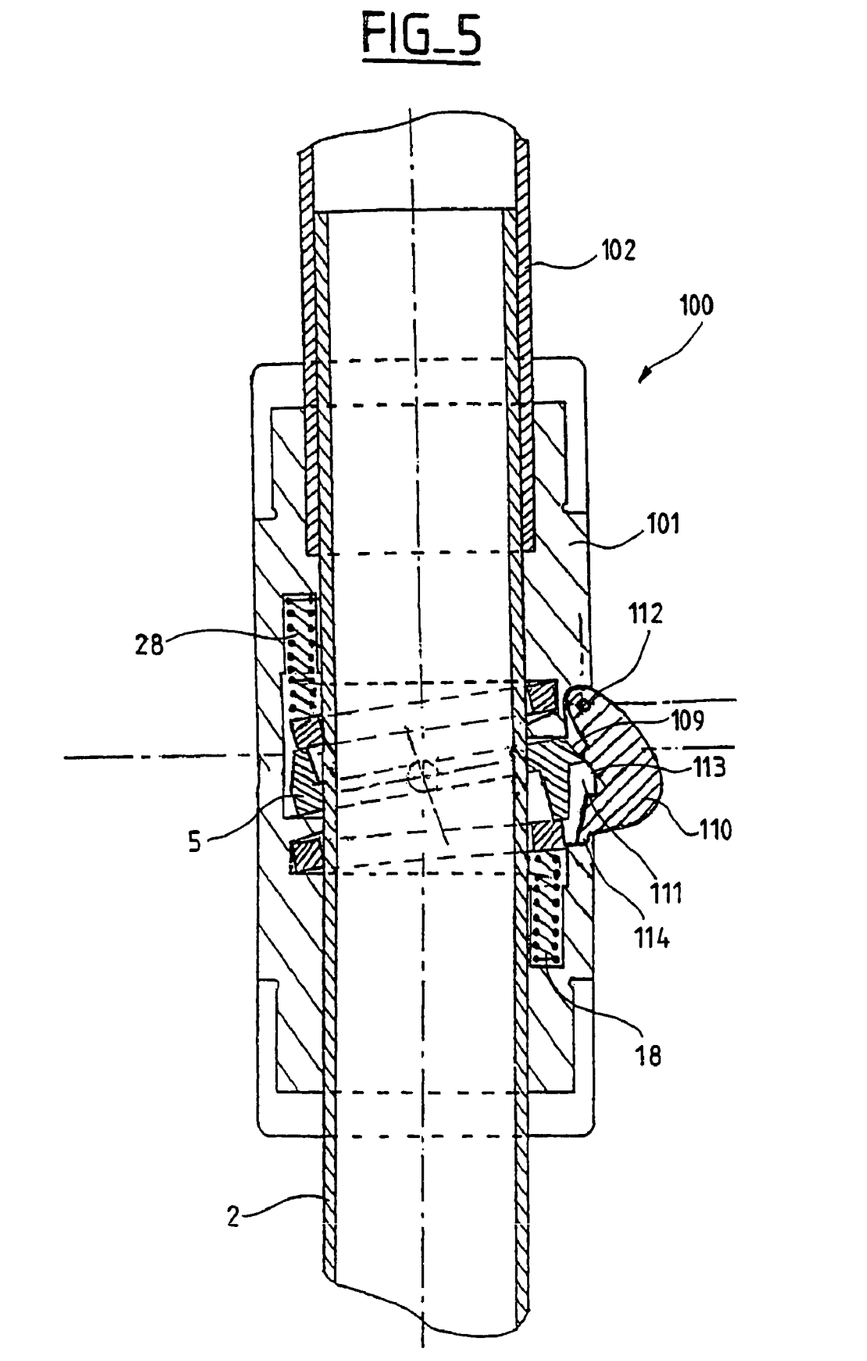
FIG. 5 represents a longitudinal section of an alternative form of embodiment of the locking device of FIG. 3, in the locked position.
Figure 6:
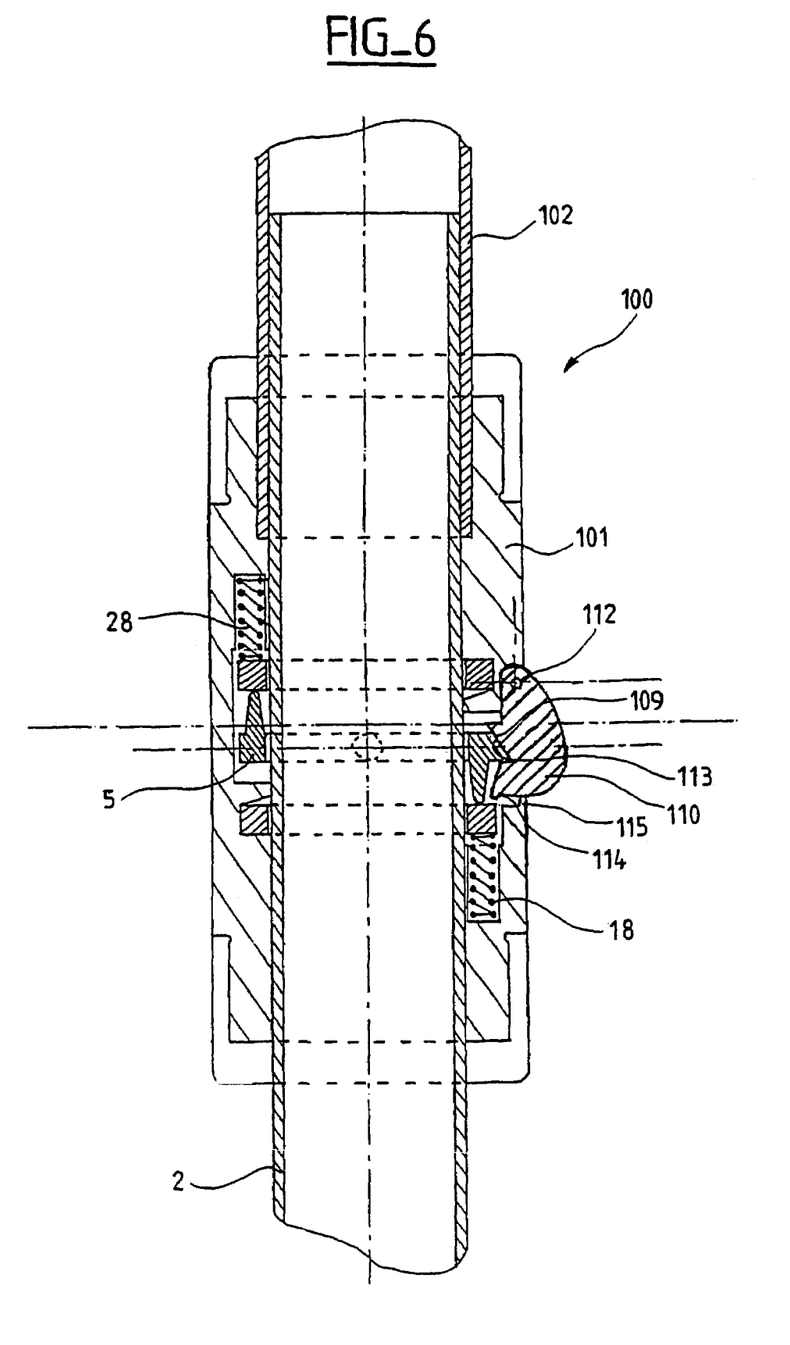
FIG. 6 represents a longitudinal section of the locking device of FIG. 5, in the unlocked position.
Figure 7:
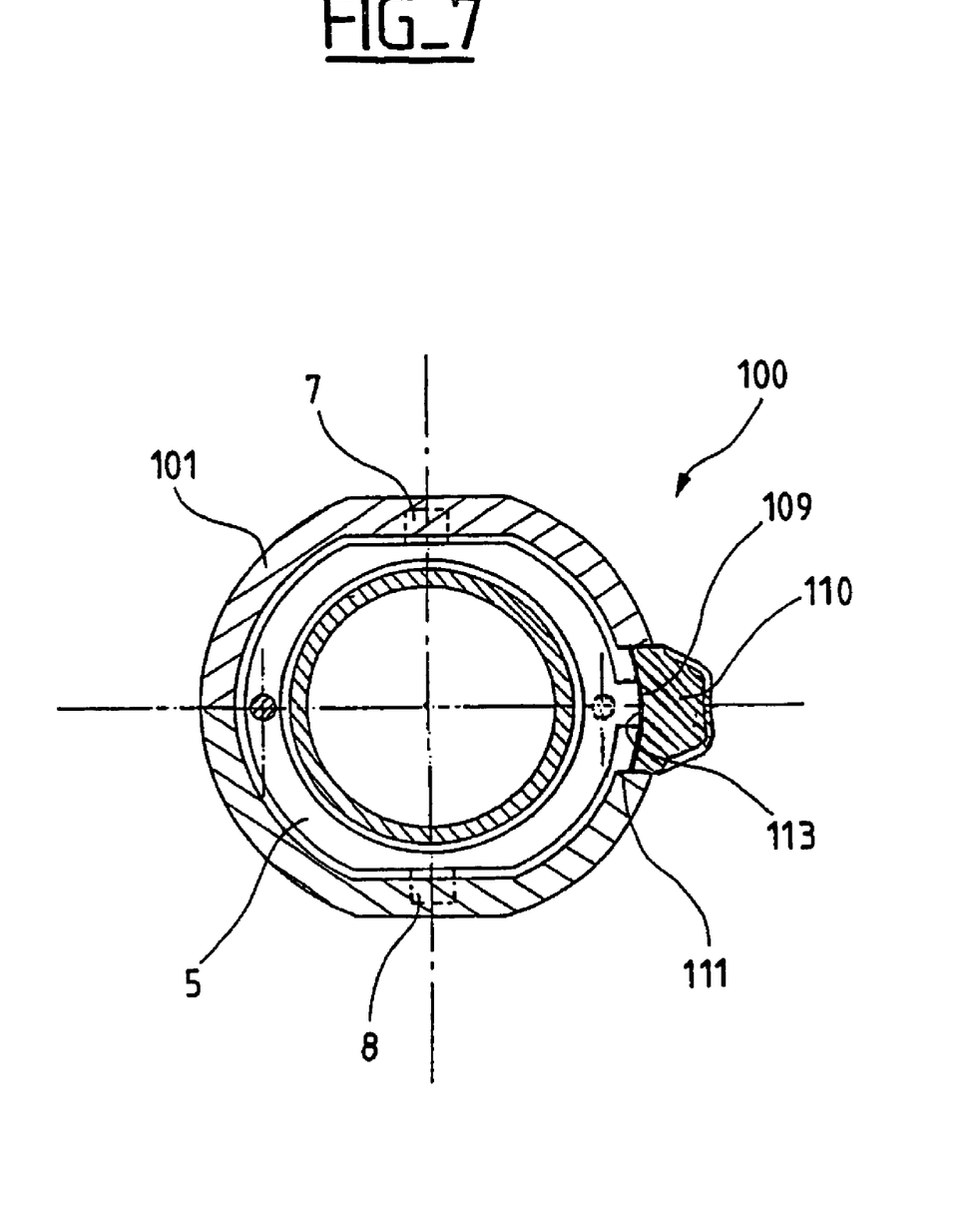
FIG. 7 represents a radial section of the device of FIG. 6.

With reference to the version represented in FIGS. 5 to 7, it can be seen that the locking device 100 differs from that represented in FIGS. 3 and 4 in that the lateral appendage 34 of the tilting washer 5 is shortened and has an inclined surface 109 at its end, in that a button 110 is placed in a through passage 111 in the wall of the casing 101, situated in the area of the inclined surface 109, and is articulated on a transverse pin 112, and in that this button 110 has an inclined surface 113 bearing against the surface 109 of the washer 5 and an appendage 114 at its free end.

As shown in FIG. 5, when the locking device 100 is in its locked position, the button 110 is moved away outwardly, its appendage 114 being in abutment against a shoulder 115 of the casing 101 provided in its passage 111.

As shown in FIG. 6, by manually exerting an inward radial pressure on the button 110, the latter is pushed into the passage 111, its appendage 114 moving inwardly away from the shoulder 115. In the process, the inclined surface 113 of the button 110 acts on the inclined surface 109 of the tilting washer 5 in the manner of a cam and pivots this washer in the direction for unlocking the device 100, as described above.

By releasing the pressure on the button 110, the pivoting washer 5 resumes its initial position under the effect of the springs 18 and 28, as described above, and pushes the button 110 outward.

The invention claimed is:

1. A device for locking two elongated elements, a first of which slides telescopically in a second, comprising means (12) for locking, in a first longitudinal direction, the first element (2) relative to the second element (4), which means comprises a locking washer (13) arranged around the first element and a circumferential portion of which is placed between two longitudinally opposite supports of said second element, and an elastic return member (18) placed between said second element and said washer and acting in said longitudinal direction on the washer at a point remote from said supports so as to bring the locking washer into an inclined end position relative to the first element, in which position two opposite portions of said locking washer are in contact with the first element in order to lock the first element (2) relative to the second element (4) in said longitudinal direction, and further comprising a tilting member (5) articulated on said second element, a spacer member (104) placed between the locking washer and the tilting member, and a control member (32) for acting on the tilting member, such that an action on said control member causes the tilting member to tilt, which tilting member, by way of the spacer member, acts on the locking washer so as to move it away from said end position counter to said return member, thereby reducing the inclination of said locking washer, in order to release the first element relative to the second element, characterized in that the tilting member (5) and the spacer member (104) are integral with each other, further comprising second means (22) for locking, in a second longitudinal direction, the first element relative to the second element, which second means comprises a second locking washer (23) arranged around the first element and a circumferential portion of which is placed between two second longitudinally opposite supports of said second element, and a second elastic return member (28) placed between said second element and said second locking washer and acting in said second longitudinal direction on the second washer at a point remote from said second supports so as to bring the second locking washer (23) into an inclined end position relative to the first element, in which position two opposite portions of said second washer are in contact with the first element in order to lock the first element relative to the second element in said second longitudinal direction, and further comprising a second spacer member (105) placed between the second locking washer and said tilting member, such that the said action on said control member likewise acts, by way of the second spacer member, on the second locking washer so as to move said second locking washer away from its aforementioned end position counter to said second return member, thereby reducing the inclination of said second locking member, in order to release the first element relative to the second element, characterized in that said tilting member (5) and said second spacer member (105) are integral with each other, wherein said tilting member comprises a tilting washer (5) which surrounds said first element at a distance and which is mounted in an articulated manner on the second element, radially to said second element, and in that at least one said spacer member comprises a projecting part (104, 105) on the face of said tilting washer that faces a corresponding said locking washer (13, 23), and wherein said circumferential portions of said locking washers and the correspondingly projecting parts of the tilting washer are respectively arranged on each side of a tilting axis of the tilting washer and in an opposed manner.

2. The device as claimed in claim 1, characterized in that said control member comprises a button (110) mounted movably on said casing so as to be able to be moved by pressure, this button and said tilting member comprising bearing surfaces (109, 113) such that when said button is moved in one direction, it acts on said tilting member in order to move said washer or washers away from its or their aforementioned end position or positions.

3. The device as claimed in claim 2, characterized in that said button (110) is mounted pivotably on said casing so as to move substantially radially.

4. The device as claimed in claim 1, characterized in that the tilting member (5) and at least one said spacer member form a single component.

5. The device as claimed in claim 1, characterized in that the second element (4) comprises a casing (101) composed of two assembled parts (4a, 4b), the plane of contact between which parts extends in a longitudinal plane (33) passing through the axis of said elements, in that said locking elements, said return members, said tilting member (5) provided with said spacer members (104, 105), and said control member (32, 34) are arranged in a space (103) formed between said assembled parts of the second element, and in that said tilting member (5) provided with said spacer members is articulated about an axis (11) of said casing perpendicular to said plane of contact (4c).

6. The device as claimed in claim 5, characterized in that said casing (101) comprises assembly collars (106, 107) which surround the ends of its aforementioned parts (4a, 4b).

7. The device as claimed in claim 5, characterized in that said second element comprises a tubular element, an end part of which is fixed to said casing and in which said first element can slide.

8. The device as claimed in claim 7, characterized in that said tubular element comprises an auxiliary longitudinal duct, and in that said control member comprises a control rod arranged in this longitudinal duct.

* * * * *